United States Patent
Strand et al.

[11] Patent Number: 5,857,047
[45] Date of Patent: Jan. 5, 1999

[54] AUTOMATED FIBER PIGTAILING MACHINE

[75] Inventors: Oliver T. Strand; Mark E. Lowry, both of Castro Valley, Calif.

[73] Assignee: The Regents of the University of California, Oakland, Calif.

[21] Appl. No.: 618,935

[22] Filed: Mar. 20, 1996

[51] Int. Cl.⁶ .................................................. G02B 00/00
[52] U.S. Cl. .............................................. 385/88; 385/90
[58] Field of Search ......................... 385/88–94; 211/13; 385/33

[56] References Cited

U.S. PATENT DOCUMENTS

| | | | |
|---|---|---|---|
| 5,018,820 | 5/1991 | Boudreau et al. | 385/33 |
| 5,361,317 | 11/1994 | Heartman et al. | 385/88 X |
| 5,467,419 | 11/1995 | Roff et al. | 385/93 |

OTHER PUBLICATIONS

C. Gabler, et al., An Optical Alignment Robot System, SPIE, vol. 703, pp. 8–27, (1986) No Month.
D.S. Bargar, An Automated Fiber Alignment, Fixing, and Hermetic Sealing System, SPIE, vol. 994, pp. 11–17, (1986) No Month.

*Primary Examiner*—Phan T. H. Palmer
*Attorney, Agent, or Firm*—John P. Wooldridge

[57] ABSTRACT

The Automated Fiber Pigtailing Machine (AFPM) aligns and attaches optical fibers to optoelectonic (OE) devices such as laser diodes, photodiodes, and waveguide devices without operator intervention. The so-called pigtailing process is completed with sub-micron accuracies in less than 3 minutes. The AFPM operates unattended for one hour, is modular in design and is compatible with a mass production manufacturing environment. This machine can be used to build components which are used in military aircraft navigation systems, computer systems, communications systems and in the construction of diagnostics and experimental systems.

3 Claims, 13 Drawing Sheets

AUTOMATED FIBER PIGTAILING MACHINE

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to fiber optics, and more specifically, it relates to fiber pigtailing machines.

2. Description of Related Art

The new technologies of high-speed communications, computer networks, and high-precision gyroscopes use optoelectronic (OE) devices and fiber optics. The main disadvantage of these components is the small size of their light emitting and transmitting areas—only a few micrometers in diameter. This means that, for example, an optical fiber must be aligned with respect to a laser diode with sub-micrometer accuracies. This is a very difficult mechanical problem and is, for the most part, performed manually by highly-skilled technicians working with microscopes and high-precision manipulators. Stress and fatigue result in only a small number of these aligning and attaching (the, so called pigtailing process) operations performed per day and with large part-to-part variations in alignment tolerances. This low production rate results in high cost for the completed OE product. Some technologies exist to perform the sub-micrometer alignments automatically by maximizing the amount of light passing between the OE components; but these systems still rely upon an operator performing the alignment sufficiently well, say a few micrometers, that some level of light can pass between the components in the first place. Although very fast (sub-second) algorithms have been developed to maximize the coupling, one of the major drawbacks of active alignment is obtaining sufficient alignment to couple some light between the OE components in the first place.

Some systems use rigid mechanical fixturing to provide the initial alignment to pass some light between the OE components, but these systems are very massive, expensive, and are custom-designed for only a specific task; many OE manufacturers are small businesses and cannot afford the initial investment of such equipment. Laser welding techniques are very robust and provide sub-micron accuracies, but require a large initial investment for the laser welder. Other alignment techniques using robotics and batch processing show promise for lowering the cost of sub-micron alignment and attachment of fibers to OE devices. Passive alignment techniques using v-grooves and other features etched in silicon waferboards show promise for lowering the cost of fiber pigtailing and are compatible with array geometries; however, obtaining sub-micron accuracies using passive alignment has proven to be difficult.

A real need exists for low-cost, flexible, high-precision automated equipment which can perform many of the processes which are presently labor-intensive in manufacturing OE products. Because labor accounts for a significant fraction of pigtailing costs, a fully automated pigtailing station should be capable of operating unattended for significant periods of time. Such topics as parts handling and feeding, initiating the coupling of light and attachment to the OE device must be considered. Many OE companies are small and cannot afford a large initial investment for such a workstation, therefore low cost is essential. Finally, flexibility to pigtail different types of OE devices is desirable to greatly reduce the costs of retooling for different products.

SUMMARY OF THE INVENTION

It is an object of the present invention to provide an automated fiber pigtailing machine.

The Automated Fiber Pigtailing Machine (AFPM) provides automatic fiber alignment and attachment in an opto-electronic (OE) assembly process. The AFPM is designed in a modular manner for maximum flexibility and standardization of parts. It is composed of many commercially available products and standard technologies to minimize the cost of the machine itself. The Automated Fiber Pigtailing Machine combines many critical technologies to perform automated sub-micron fiber pigtailing compatible with a low-cost manufacturing environment. These technologies include high-precision stages, computer vision to replace the labor-intensive coarse alignment, and many details of parts handling and feeding. Since the AFPM has been designed to operate unattended for long periods of time, it is compatible with a mass-production manufacturing process which is the type of technology necessary to lower the cost of any commercially-available high-volume product.

The AFPM can perform each pigtailing operation in less than 3 minutes (including the epoxy curing time) and operate unattended for up to 1 hour. During the alignment operation, the OE device is held fixed while the ends of the fibers are moved by the high-precision stages. These machines incorporate a 2-step procedure to perform sub-micron alignments. The first step uses computer vision to align the fiber sufficiently close (few microns) to the OE device to couple light between the fiber and the device; the second step then achieves the sub-micron alignment by maximizing the light throughput. The overall design of the AFPM was carefully considered to minimize the requirements for high-precision machining tolerances; this greatly reduced the cost of building the AFPM. The modular nature of the AFPM means that each machine may be easily customized for a particular application. A basic set of modules was designed to build prototype AFPMs which can pigtail devices with 3 very different geometries including a photodiode and two different types of waveguide devices; a different set of the same modules would allow laser diodes to be pigtailed, for example.

The required resolution of the high-precision stages was determined by the mode size of the waveguide device and the corresponding single-mode fiber to be pigtailed. The resolution of the stages needs to be a small fraction of the waveguide dimensions to ensure high coupling efficiencies. The range of the stages was determined by the working volume required by the AFPM to access the interior of the 14-pin DIP package of the photodiode.

The issue of parts handling and feeding becomes important for an automated system compatible with a manufacturing environment. The parts handling scheme allows the AFPM to operate unattended for significant amounts of time. Many aspects of the electronics industry are fully automated in terms of feeding parts to the assembly stage, so the technology is well developed. For this project, however, a parts handling scheme was developed which relies upon the operator to load the OE device and the fibers into the kit tray. The tray body is standard for all applications while only the device cartridge in the center is customized for each OE device. A set of six loaded kit trays is placed onto a pallet by the operator who then places the pallet onto the conveyor system of the AFPM. The conveyor system delivers the OE devices to the alignment stages and vision system. The conveyor system may be chosen to have any length necessary to allow the desired time of unattended operation. The operator is now free to continue loading kit trays while the AFPM performs the pigtailing operation.

One of the design criteria was that the OE devices be pigtailed with approximately 2 meters of fiber. This single criteria had a great impact upon the design of the AFPM parts handling scheme. The only tenable method to handle such long fiber in an automated manner was to wind the fiber onto spools. Adopting the notion of having spools required the use of some form of tray to hold the fiber and the OE device. The spools were kept as small as possible and were molded from plastic for light weight. The spools are built from two halves which can be separated to remove the fiber from the spools after the pigtailing process.

Subsequent generations of the AFPM may build upon the design concepts developed here to pigtail fibers to OE devices in more complicated geometries. For example, all applications for this project use epoxy to attach the fibers, so no applications using solder or laser welding have been considered. Also, the stages to manipulate the fibers provide only 3 axes of translation, so no rotational degrees of freedom are available, including the very important roll axis for polarization-dependent applications.

DETAILED DESCRIPTION OF THE INVENTION

Figure 1:
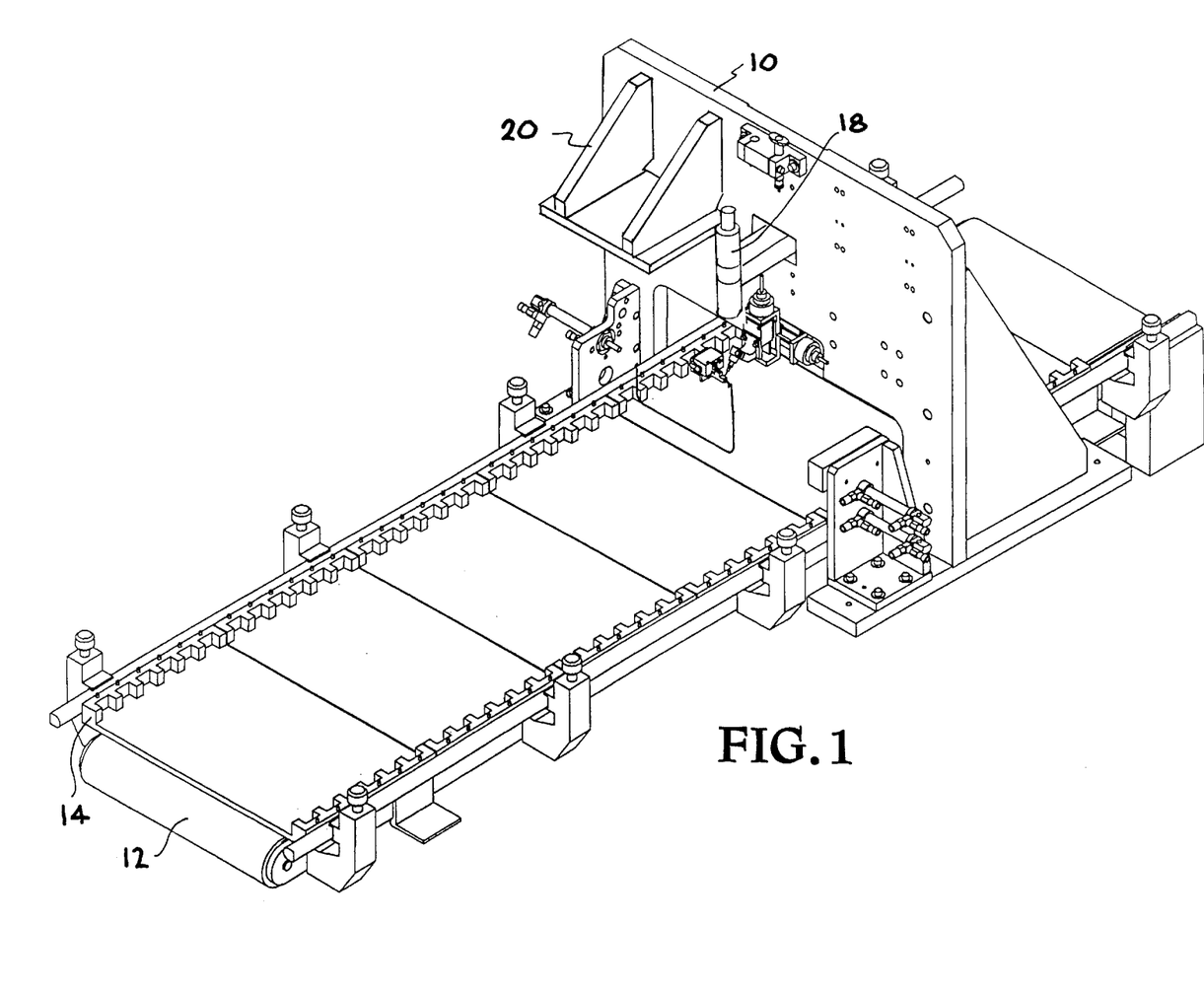
FIG. 1 shows an overview of the Automated Fiber Pigtailing Machine with 1 high-precision stage.
Figure 2:
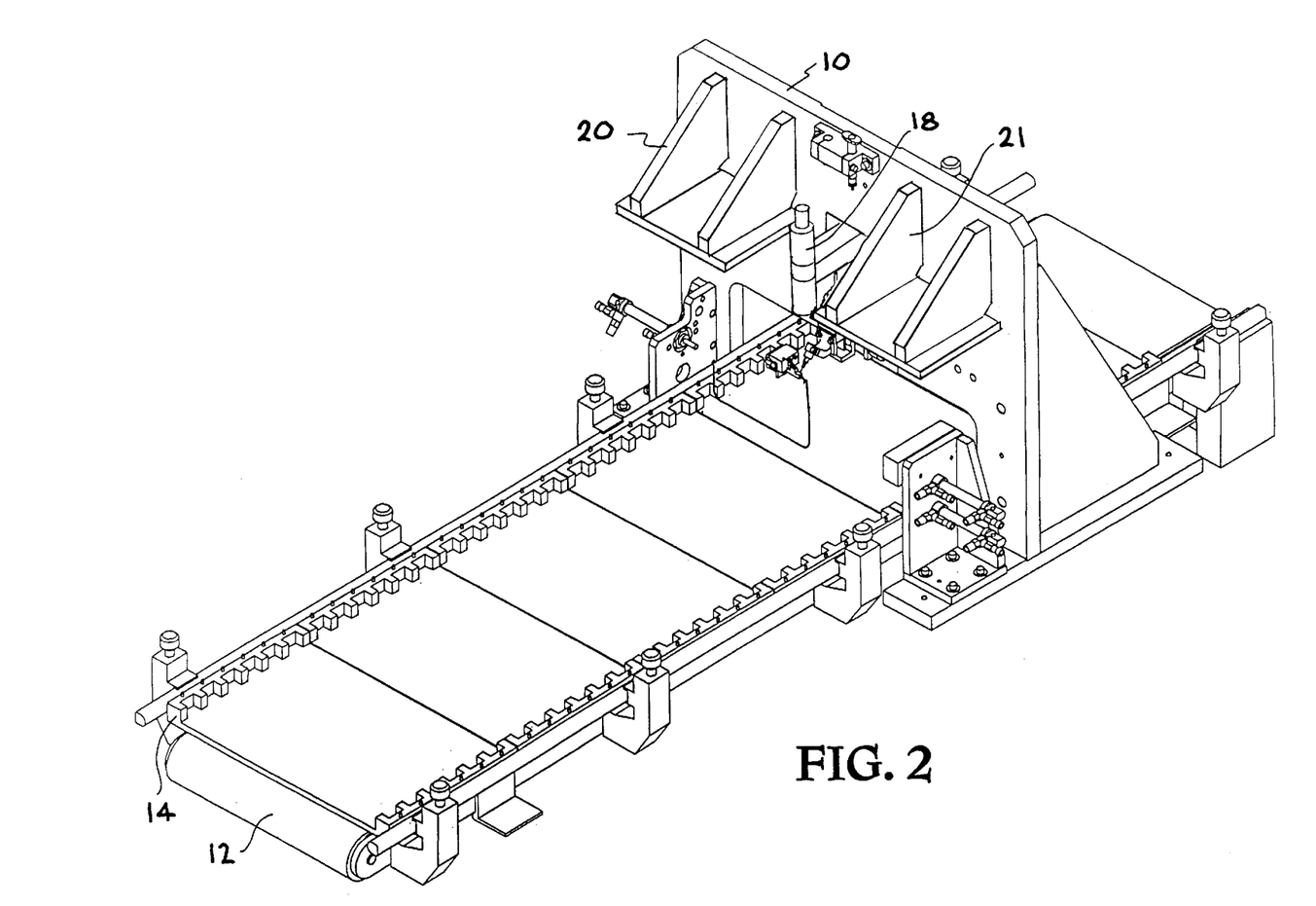
FIG. 2 shows an overview of the Automated Fiber Pigtailing Machine with 2 high-precision stages.
Figures 3A, 3B:
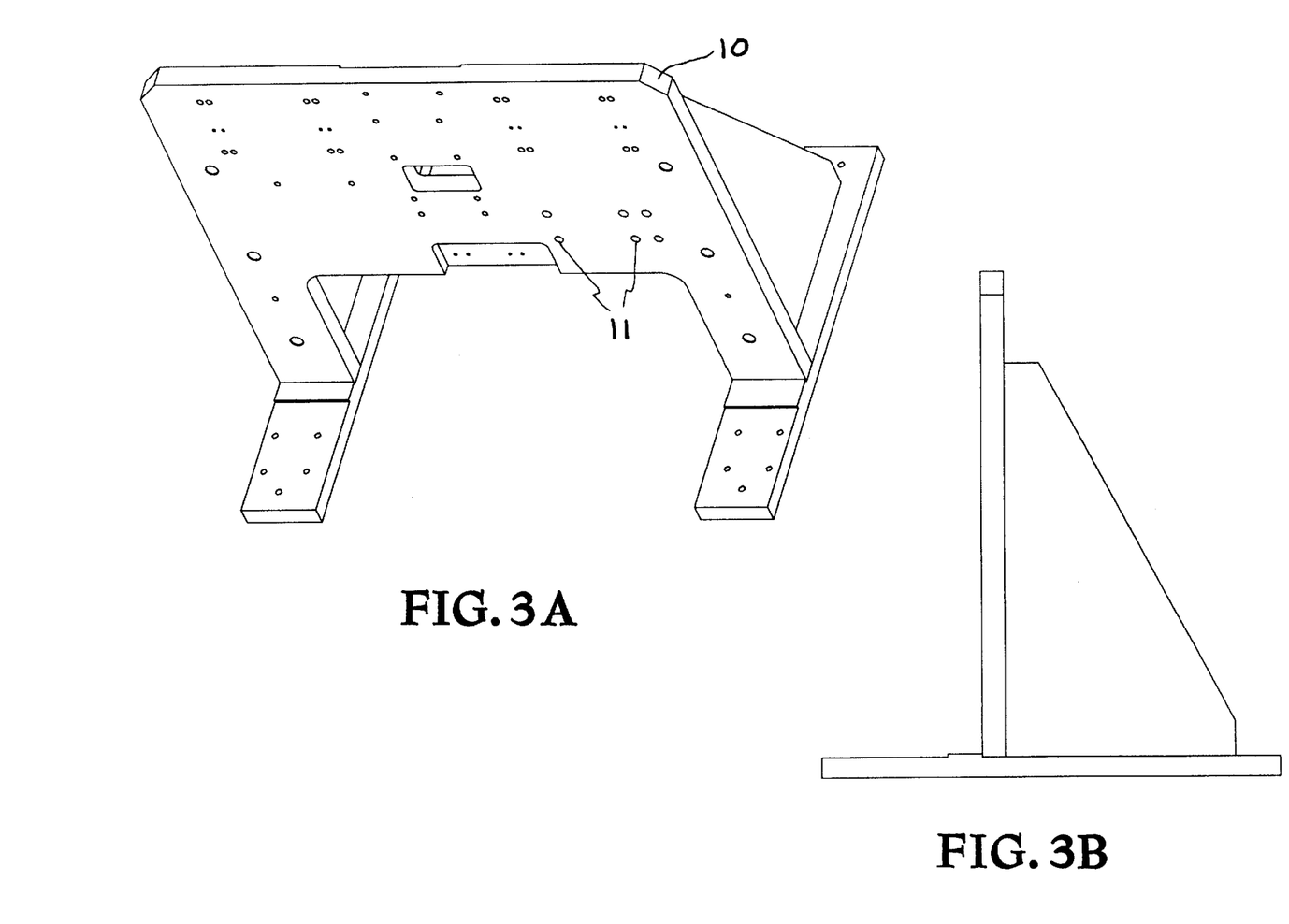
FIGS. 3A and 3B show the frame that supports the various modules.
Figure 4A:
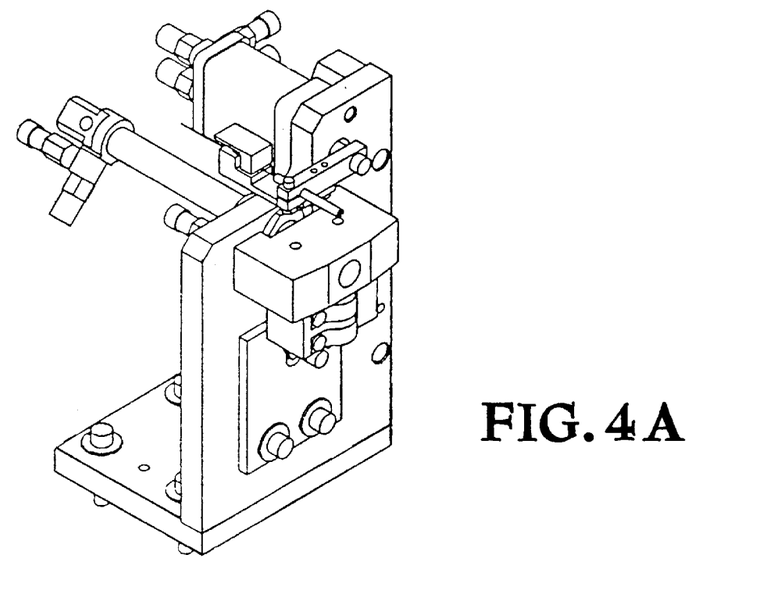
FIGS. 4A–C schematics of the left bracket assembly supported by the frame.
Figure 4B:
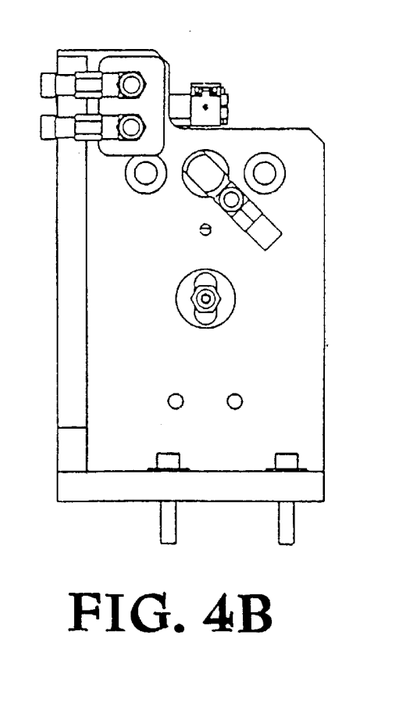
Figure 4C:
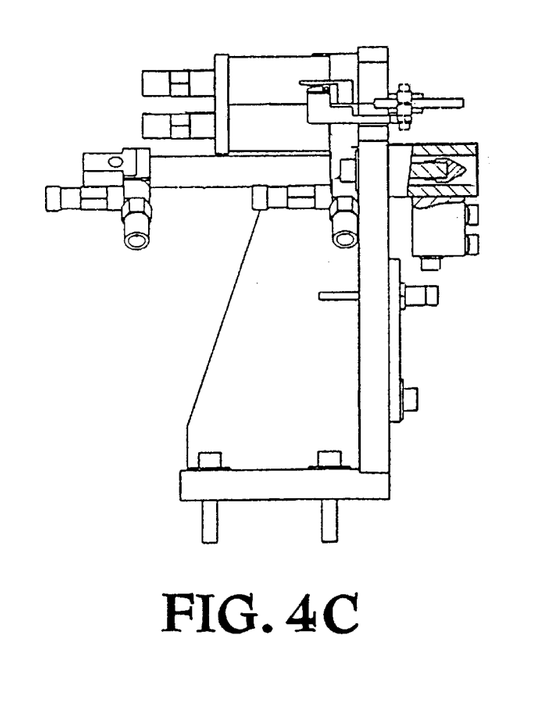
Figure 5A:
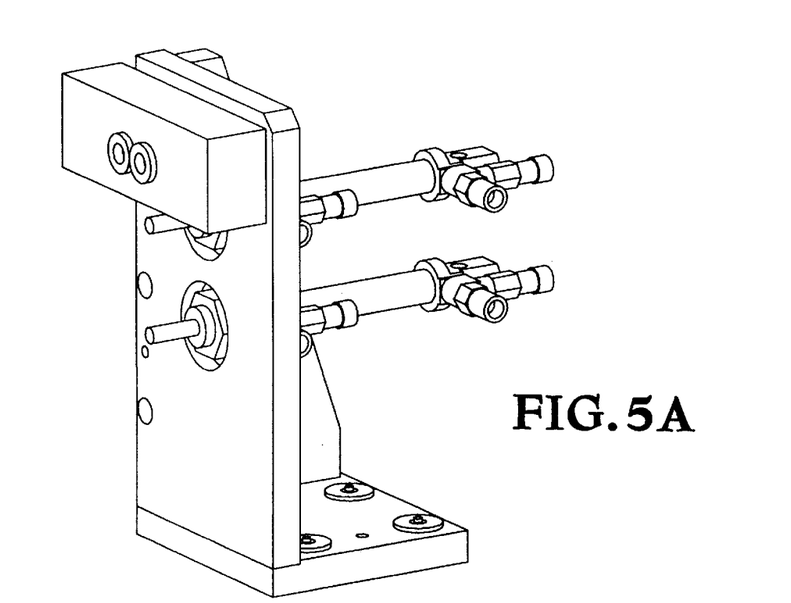
FIGS. 5A–C are schematics of the right bracket assembly supported by the frame.
Figure 5B:
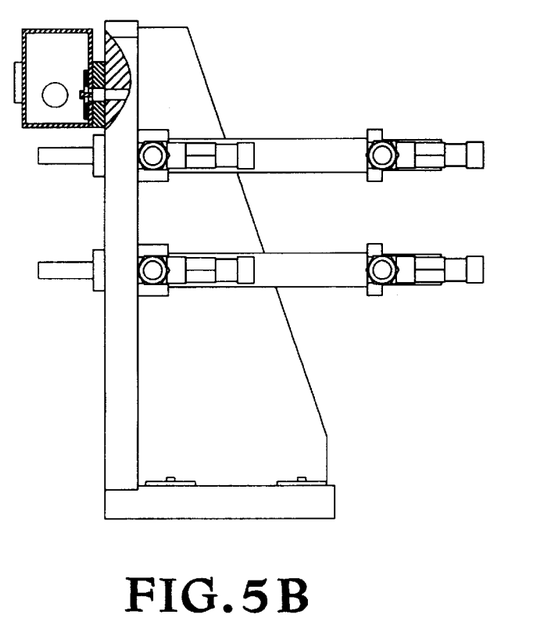
Figure 5C:
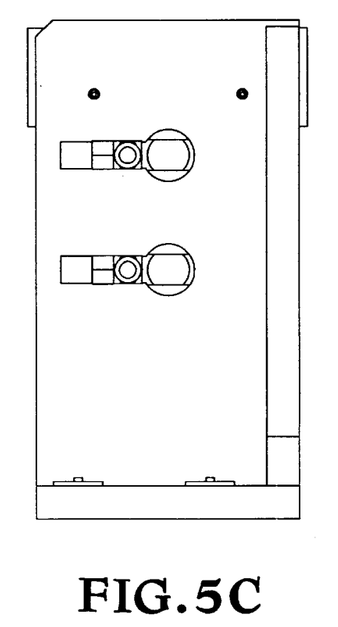

The invention is an Automated Fiber Pigtailing Machine (AFPM) designed to align and attach optical fibers to optoelectronic (OE) devices. The AFPM shown in FIG. 1 has one high-precision stage 20 mounted on the left side of the frame 10 to pigtail a photodiode, while the AFPM shown in FIG. 2 has 2 high-precision stages 20, 21, to pigtail a waveguide device. The major elements of the machine are a frame 10 and a parts handling module 12. The parts handling module consists of a conveyor system to deliver the OE device and fibers to the alignment position. A pallet 14 is placed onto the module 12 and is loaded with kit trays (not shown) which hold the fiber optic and OE devices (not shown). In one embodiment of the invention, various modules of the Automate Fiber Pigtailing Machine (AFPM) mount onto a standard frame which measures 25" long by 22" high. FIGS. 3A and 3B show the frame 10 which has a sufficient number of holes 11 to accommodate any combination of modules. Frame 10 holds a set of brackets shown in FIGS. 4A–C and 5A–C. The brackets hold indexing pistons which position the kit tray 16 during the pigtailing procedure. The bracket shown in FIGS. 4A–C also holds a reference surface to precisely locate the kit tray and a source coupling module. The bracket in FIGS. 5A–C also holds a photodiode module to receive signals from the OE device to maximize the signal for the sub-micron alignment. In addition to the high-precision stages and the tray-indexing brackets, FIGS. 1 and 2 show that frame 10 holds a vision system 18, an epoxy dispensing system, and an epoxy-curing system.

The high-precision stages 20 can be commercially available products and provide 3 axes of translation. In one embodiment, the range of the stages is 25 millimeters and the resolution is 0.1 micrometers for each axis. Fixtures are attached to the bottom of the stages which use vacuum to grab the fibers and move them to the desired locations.

Figure 6A:
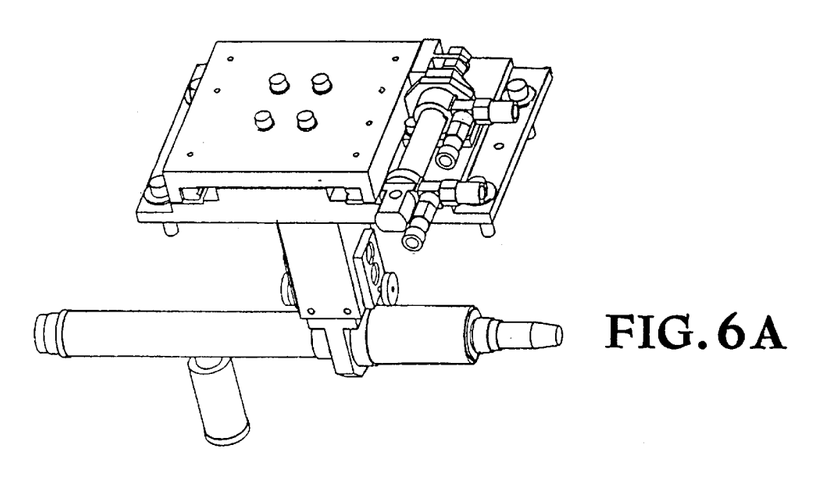
FIGS. 6A–C are schematics of the camera assembly for the vision system.
Figure 6B:
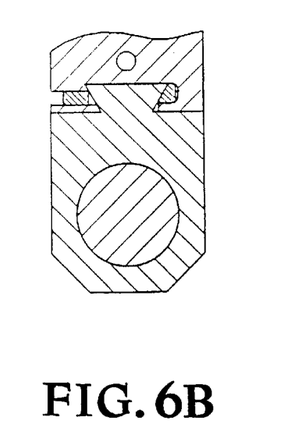
Figure 6C:
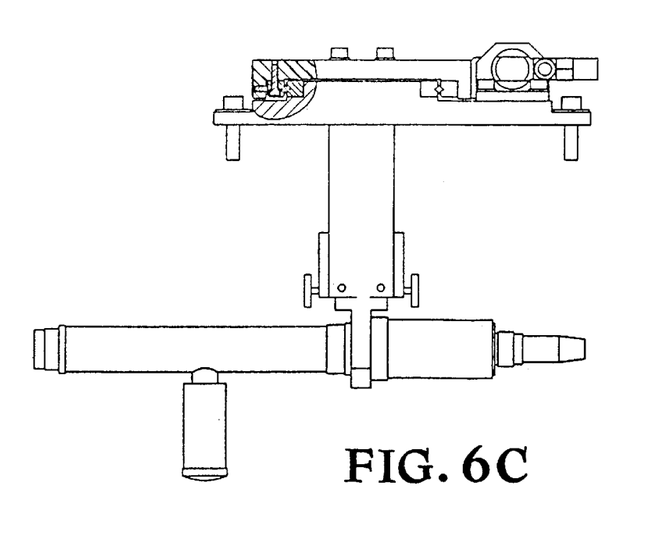
Figure 7:
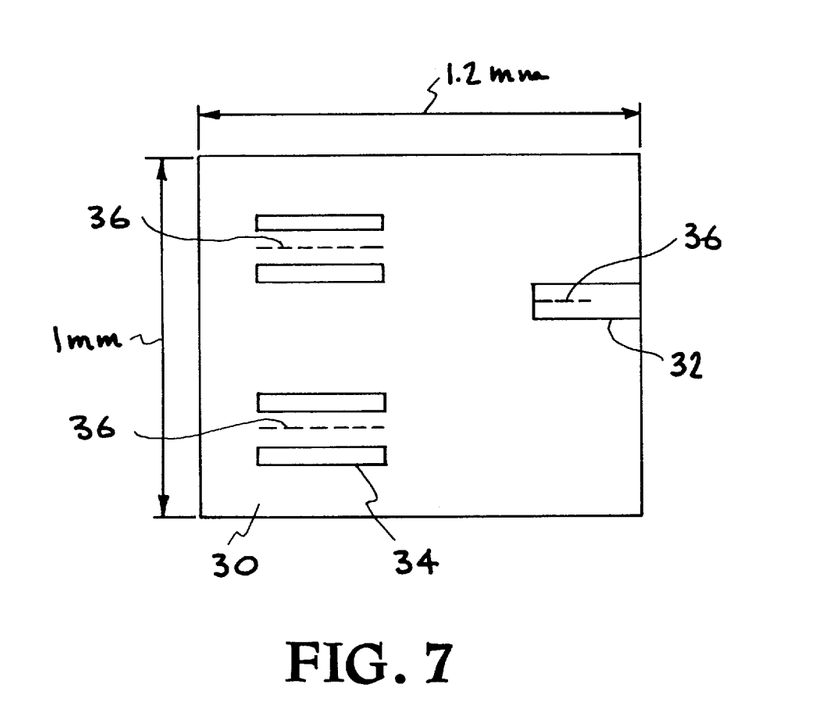
FIG. 7 is a schematic of a camera image showing the waveguide device on the left side of the image and the end of a fiber on the right side.

The vision system 18 enables the AFPM to perform sufficient alignment to couple light prior to maximization. FIG. 6 is a schematic of the camera assembly for the vision system. The vision system greatly reduces mechanical fixturing constraints by requiring the OE device and the fibers to be positioned only within the field of view of the camera. In one embodiment, the camera field of view is approximately 1 mm by 1.2 mm with approximately 2 micron resolution. FIG. 7 is a schematic of a camera image showing the waveguide device 30 on the left side of the image and the end of a fiber 32 on the right side. Fiducials 34 indicate where the invisible waveguides are located. The dotted lines 36 indicate the computer-found locations for the waveguides and the fiber end. Achieving mechanical precisions sufficient to locate the OE device 30 and the end of the fiber 32 within this field of view is fairly straightforward. Object-recognition algorithms allow the AFPM to determine the initial locations of the OE device 30 and the fiber 32; this image analysis takes between 1 second to 6 seconds, depending upon the complexity of the image. The 2-micron resolution of the vision system allows the fiber to be moved to within a few microns of the desired initial position. This is sufficiently accurate to ensure that some coupling of light between the OE device 30 and the fiber 32 will occur. At this point, the AFPM switches to active feedback to perform the sub-micron alignment, that is, the AFPM performs a series of peak-finding motions until the coupling efficiency is maximized.

Figure 8:
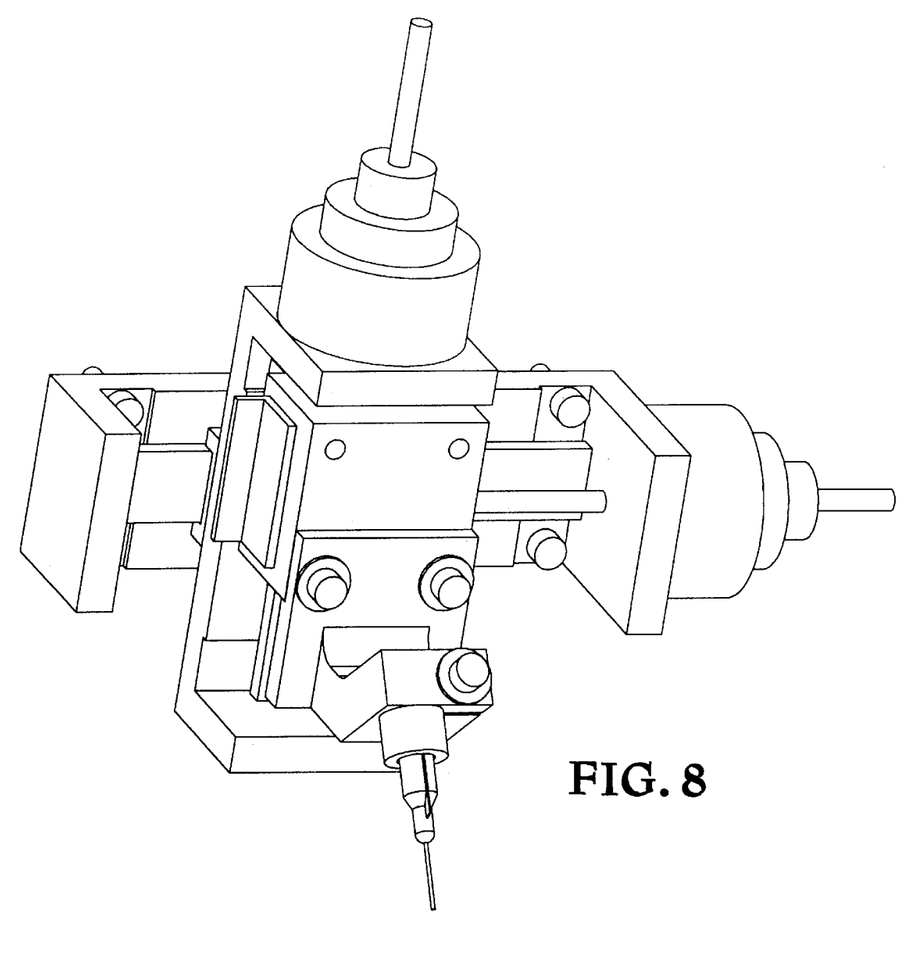
FIG. 8 is a schematic of the epoxy dispensing system.

The epoxy dispensing system uses a commercially available product to regulate the amount of epoxy for each application. The amount of air pressure applied to the epoxy and the length of time that the air is applied may be adjusted. The product also provides for epoxy dispensing tips of various diameters to further control the amount of epoxy dispensed. In one embodiment, the epoxy dispensing tip is carried on a set of 2-axis stages shown in FIG. 8 to apply the epoxy in the desired locations near the OE device. In a second embodiment, the epoxy dispensing tips are held fixed near the OE device and the end of the fibers are moved to the tips for the epoxy application. In all cases, a blue light or UV light curing system is provided to cure the epoxy after dispensing.

The kit tray 40 (FIG. 9) is designed for easy placement of the OE device and the fibers with sufficient accuracy to allow alignment by the AFPM. The overall design of the kit tray body is standard for all applications. In one embodiment, the kit tray measures 15" long by 3.5" high by 1" thick. The tray body 42 is cast from hard plastic and has tapered holes in each to allow the indexing pistons to provide 25 micron repeatability of the placement of the OE device with respect to the vision system from tray to tray. The kit tray body has sufficient holes and locating pins to accommodate any combination of fixtures for a given OE device. The kit tray body also has provisions for electrical contacts (FIG. 10) to be made when indexed into position to provide power to the OE device or to monitor the signal from the OE device.

Figure 11:
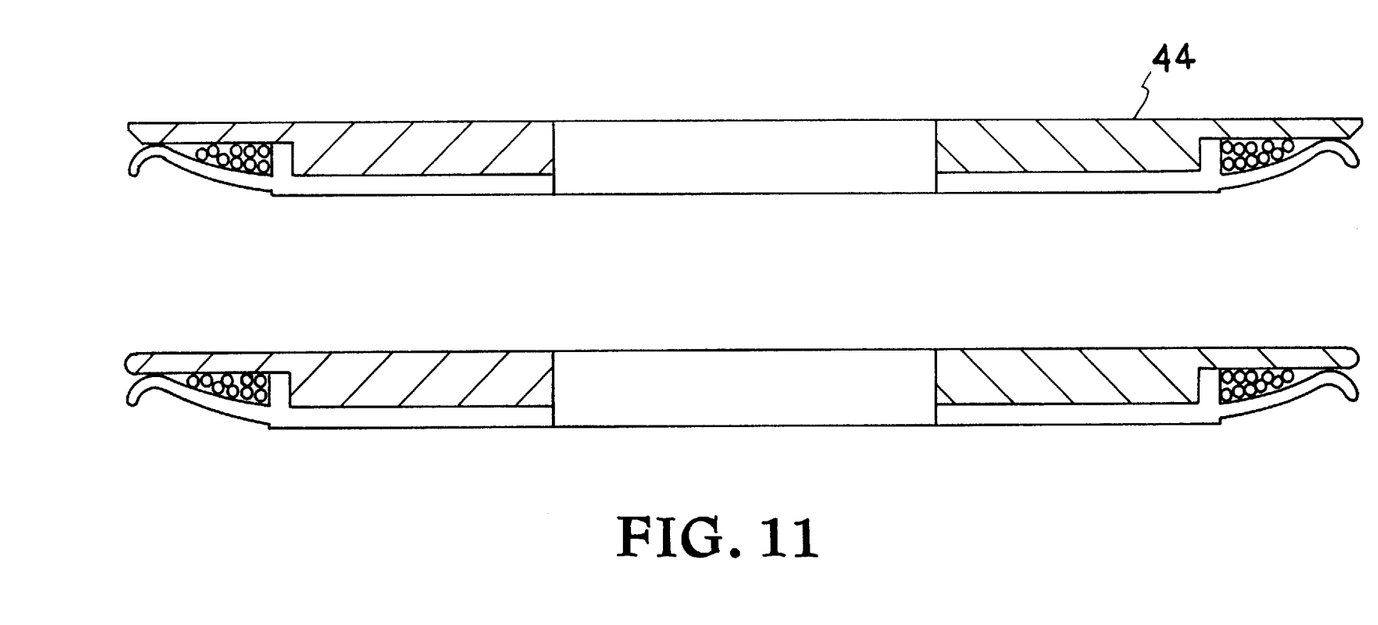
FIG. 11 shows the edge view of 2 versions of the fiber spool.

The kit tray can hold up to four spools 44 (FIG. 11) of fiber depending upon the type of OE device to be pigtailed. In one embodiment, the dimensions of the spools are 3.25" diameter by 3/16" thick. The spools have several features to accommodate the requirements of the AFPM and the OE device manufacturer. The spools are designed to fit into the kit trays and onto a winder to wind fiber onto the spools. The spools have sufficient volume to hold up to 2 meters of different size fibers. The spool body is comprised of 2 non-identical halves which separate to remove the fiber after the pigtailing operation. The spools are designed so that the rims of each half press together around the entire circumference so that the fiber will not unwind of its own accord and yet an arbitrary length of fiber may be unwound and rewound to accommodate other fiber preparation steps prior to pigtailing. Finally, 2 holes placed in the spools allow a simple tie wrap to be placed around the windings of the fiber in the spool so that the fiber remains in a coil when the 2 halves are separated to remove the fiber.

Figure 12:
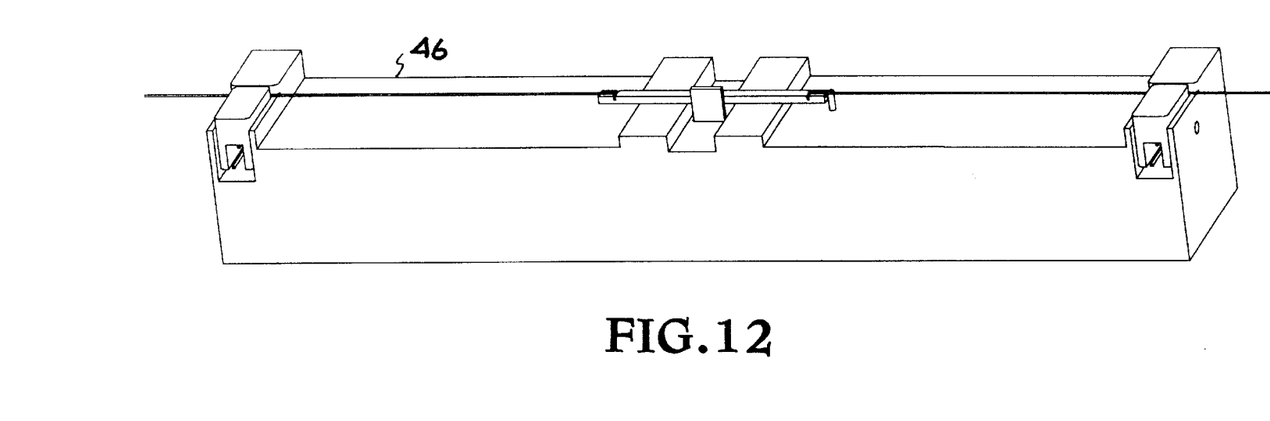
FIG. 12 shows a device cartridge for the waveguide device.
Figure 13:
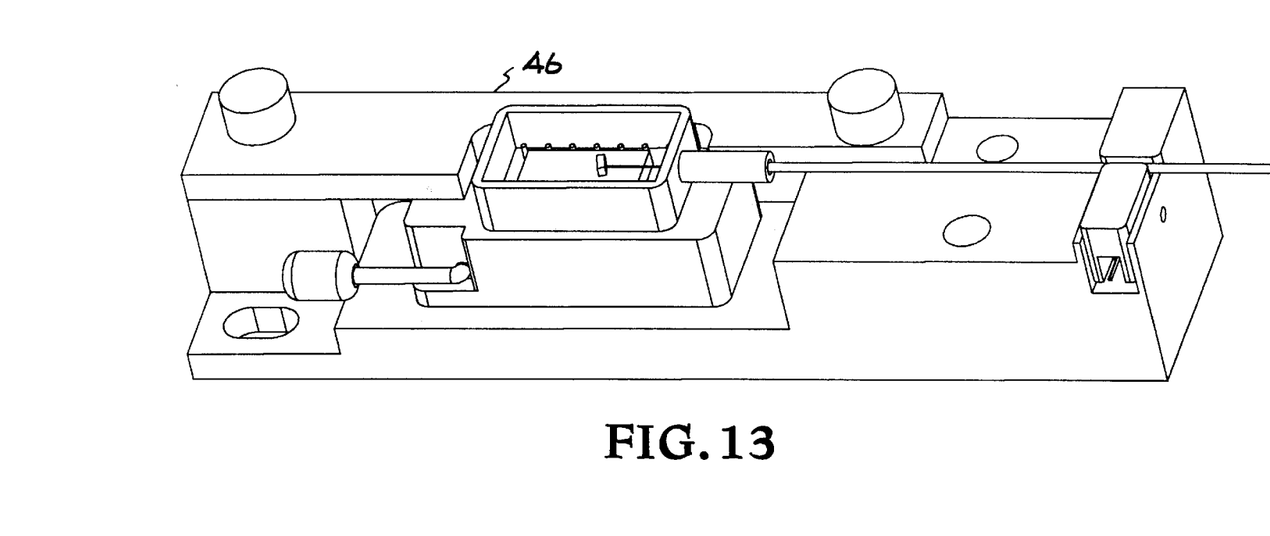
FIG. 13 shows a device cartridge for the photodiode device.

Unfortunately, every OE device has a different geometry so no standardization of the kit tray is possible for the fixture to hold the device. Therefore, the kit tray body is designed to accommodate a device cartridge 46 which fits onto the top of the tray body; the device cartridge is one of the few AFPM components which must be custom designed for each OE device application. All device cartridges are made to fit the standard hole pattern and locating pins on the top of the kit tray. FIG. 12 shows one embodiment of a device cartridge to hold a waveguide device. This design allows for easy placement of the waveguide device with sufficient accuracy for the vision system to locate the important features for the pigtailing process. There are small clamps at each end of the device cartridge to easily secure the fibers in position near the OE device with sufficient accuracy for the AFPM to pick up the fibers. FIG. 13 shows a second embodiment of the device cartridge to hold an industry-standard 14-pin DIP package. This design uses a commercially available zero-insertion-force connector to accept the 14-pin DIP package and locate it with sufficient accuracy for the vision system to locate the OE device in its field of view. As before, there is a small clamp at one end of the device cartridge to easily secure the fiber in position near the OE device with sufficient accuracy for the AFPM to pick up the fiber.

Figure 9:
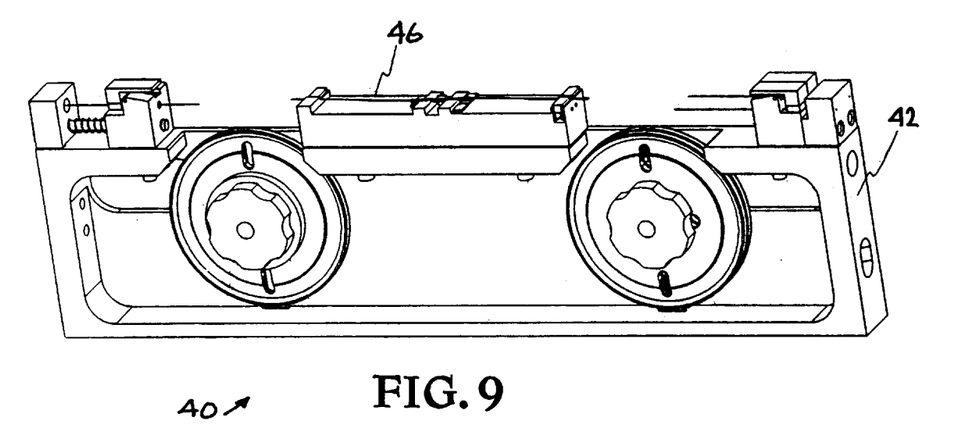
FIG. 9 shows a single kit tray for the waveguide device.
Figure 10:
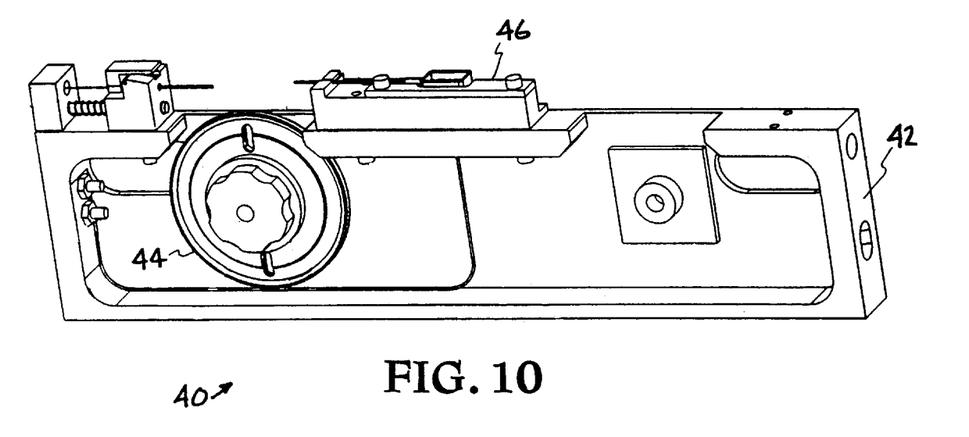
FIG. 10 shows a single kit tray for the photodiode device.
Figure 14A:
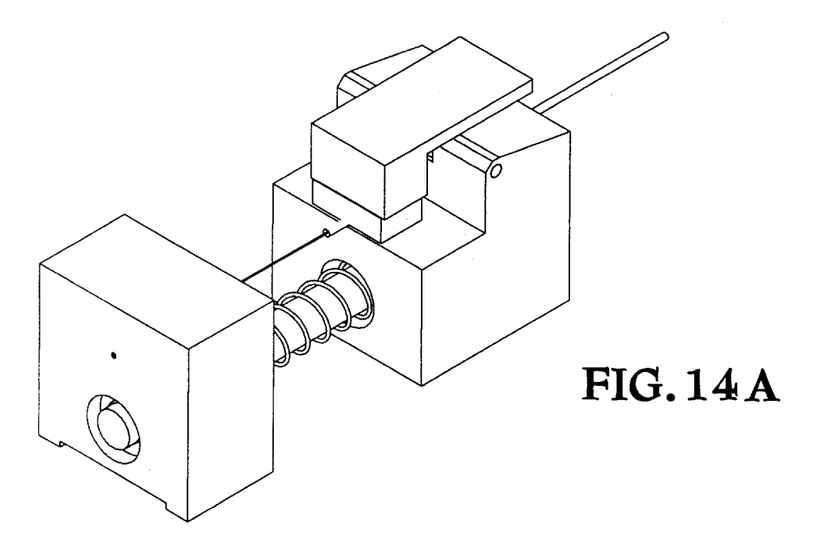
FIGS. 14A–C show a fiber guide for the input fiber.
Figure 14B:
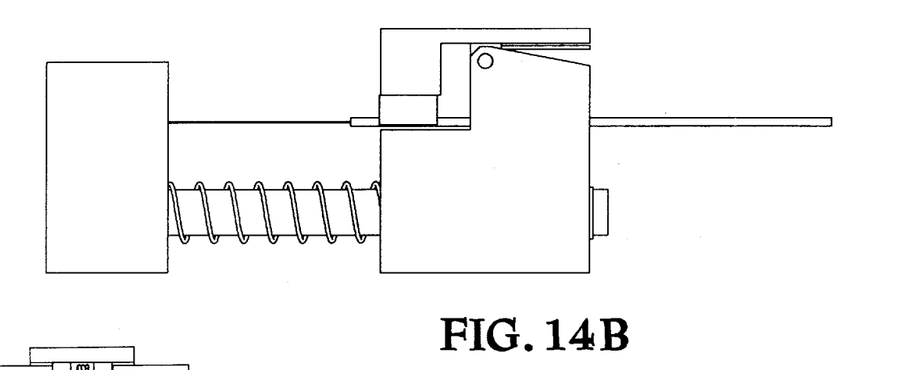
Figure 14C:
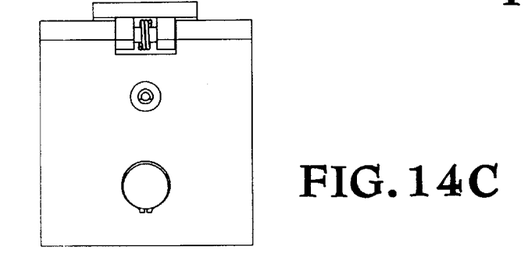
Figure 15A:
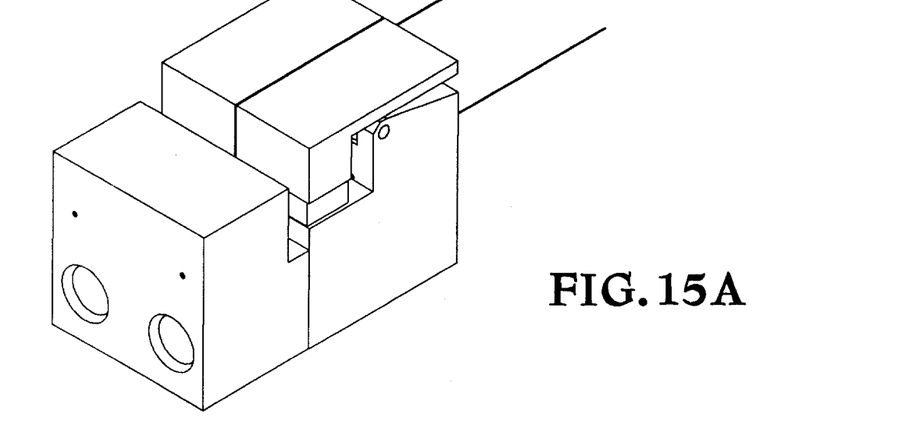
FIGS. 15A–C show a fiber guide for the output fibers.
Figure 15B:
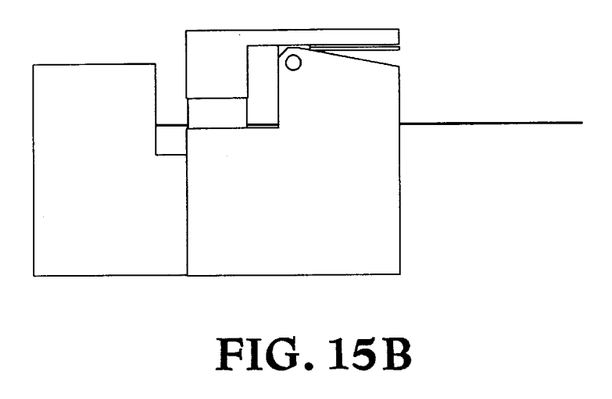
Figure 15C:
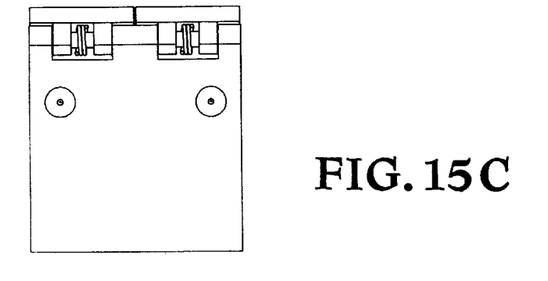

Also mounted on the top of the kit tray are fixtures to hold the end of the fiber opposite the OE device, that is, the ends at the source coupling module and the photodiode module. When the kit tray is indexed by the pistons, the fiber ends at the outboard ends of the kit tray must be located with sufficient precision that the source coupling will engage the input fiber on the left end and that the light from the output fiber on the right end will shine onto the active areas of the photodiode module. FIGS. 14A–C show the spring-loaded fiber guide that is mounted on the left end of the kit tray as shown in FIG. 10, while FIGS. 15A–C show the output fiber guide that is mounted on the right end of the kit tray as shown in FIG. 9. Both types of fiber guides have tapered holes to ease the insertion tolerance of the fiber into the fixtures. These parts are designed so that the fiber end must be positioned flush with the outboard surfaces of the fiber guides for proper operation of the source coupling module and the photodiode module.

The completed AFPM includes an electronic rack which houses electronic components necessary to operate the AFPM, including power supplies, relays, solenoids, switches, circuit breakers, computer, monitors for the computer and for the vision system, and the control boxes provided with the commercially available products such as the curing light, epoxy dispenser, vision system camera and the conveyor system.

One embodiment of the software necessary to operate the AFPM, to control the sequence and timing of events, and to perform the vision system object recognition algorithms is written in the C++ programming language and runs on a 486-based personal computer.

Changes and modifications in the specifically described embodiments can be carried out without departing from the scope of the invention, which is intended to be limited by the scope of the appended claims.

We claim:

1. An automated fiber pigtailing machine, comprising:

means for aligning an optical fiber sufficiently close (few microns) to an optoelectronic device to couple light between said fiber and said device, wherein said means for aligning an optical fiber comprise:
   a first high precision stage operatively connected to said fiber optic;
   a second high precision stage operatively connected to said optoelectronic device;
   a computer system comprising memory, input/output devices and an object-recognition algorithm;
   a first fiducial placed on said optical fiber;
   a second fiducial placed on said optoelectronic device; and
   a camera operatively located to view said optical fiber and said optoelectronic device, wherein said camera is electrically connected to send a real time view of said optical fiber and said optoelectronic device to said computer system wherein said object-recognition algorithm locates said first fiducial and said second fiducial in space such that precise Cartesian coordinates are then generated by said object-recognition algorithm and used by said computer system to generate position commands that precisely move said optical fiber to where it needs to be to couple light to and/or from said optoelectronic device;
   means for maximizing the light coupled between said fiber and said device; and
   means for attaching said optical fiber to said optoelectronic device.

2. The automated fiber pigtailing machine of claim 1, wherein said means for maximizing the light coupled between said fiber and said device comprise an active feedback system to perform sub-micron alignment wherein a series of peak-finding motions are performed until said light coupled between said fiber and said device is maximized.

3. The automated fiber pigtailing machine of claim 1, wherein said means for attaching said optical fiber to said optoelectronic device comprise an epoxy dispensing and curing system.

* * * * *